(12) United States Patent
Hoang et al.

(10) Patent No.: US 6,551,100 B1
(45) Date of Patent: Apr. 22, 2003

(54) DEVICE FOR THERMALLY TREATING A MATERIAL

(75) Inventors: Van Hiep Hoang, Munster (DE); Herbert Pingel, Lane Hiram, GA (US); Karl Johann Lampe, Ennigerloh (DE)

(73) Assignee: Krupp Polysius AG., Beckum (DE)

( * ) Notice: Subject to any disclaimer, the term of this patent is extended or adjusted under 35 U.S.C. 154(b) by 0 days.

(21) Appl. No.: 09/959,017

(22) PCT Filed: Mar. 24, 2000

(86) PCT No.: PCT/EP00/02644

§ 371 (c)(1),
(2), (4) Date: Apr. 10, 2002

(87) PCT Pub. No.: WO00/63629

PCT Pub. Date: Oct. 26, 2000

(30) Foreign Application Priority Data

Apr. 16, 1999 (DE) .......................................... 199 17 310

(51) Int. Cl.[7] ................................................. F27B 15/02
(52) U.S. Cl. ............................ 432/58; 432/16; 106/756
(58) Field of Search ............................ 432/13, 14, 15, 432/16, 58, 106; 110/245; 106/744, 756

(56) References Cited

U.S. PATENT DOCUMENTS 3,843,314 A * 10/1974 Ishikawa ..................... 432/58
4,464,112 A * 8/1984 Heinemann et al. ........ 432/106
4,901,448 A * 2/1990 Rother et al. ................. 34/85

FOREIGN PATENT DOCUMENTS

| DE | 2751876 | 5/1979 |
| DE | 3735825 | 5/1989 |
| EP | 0497937 | 3/1992 |
| EP | 0526770 | 2/1993 |

* cited by examiner

Primary Examiner—Gregory Wilson
(74) Attorney, Agent, or Firm—Muramatsu & Associates

(57) ABSTRACT

The invention relates to an apparatus for treatment of material, especially for thermal and/or chemical treatment, having an ascending pipeline branch, a diversion chamber and at least one descending pipeline branch. In the diversion chamber there is provided a deflecting wall that is oriented substantially transversely to the direction of flow of the material entering the diversion chamber via the ascending pipeline branch.

12 Claims, 16 Drawing Sheets

DEVICE FOR THERMALLY TREATING A MATERIAL

The invention relates to an apparatus for the treatment of material, especially for the thermal and/or chemical treatment of meal-form raw material.

Such apparatus is used in particular for the calcination of meal-form cement raw material. In that case, the exhaust gas flow of a sintering stage (kiln) and the outgoing air flow of a cooling stage (tertiary air) are used jointly in the fuel-fed ascending pipeline branch of a calcining stage for calcination of the raw meal. In this connection, the gas-solids dispersion in the calcining stage is diverted from the ascending pipeline branch into a descending pipeline branch, and for the purpose of separating the calcined raw meal from the flow of gas is introduced into the lowest cyclone of a cyclone pre-heater.

To achieve the best possible degree of calcination in this calcining stage, efforts are made to carry out optimum intermixing and fluidisation of the gas-raw meal-fuel dispersion in the calcining stage. Intensive mixing and fluidisation of the dispersion can, on the one hand, improve the thorough combustion of the fuel and the $NO_x$ reduction of the calcinator exhaust gases (and at the same time reduce the emission of uncombusted constituents), and, on the other hand, increase the degree of calcination through improved heat transfer from the fuel to the material.

Various solutions for fluidisation and mixing of the dispersion in the calcining stage are already known from practice. For example, obstructions were built into the ascending and descending pipeline branch or a fluidisation chamber was provided in the region of the upper change of direction.

EP-B-0 497 937, for example, discloses a calcining stage in which, in the region of its change in flow direction, there is provided a fluidisation chamber, in which at least a fraction of the coarse grain particles are separated from the gas-solids dispersion, which fraction is then re-introduced into a branch of the calcining stage upstream and/or downstream of the fluidisation chamber.

A fluidisation chamber is furthermore known from EP-A-0 526 770. In its upper region, it has an opening for tangential entry of the gas-solid dispersion, and at its underside a central opening for discharge of the fluidised gas-solids dispersion. In this instance it is possible to divert part of the solids in the region of the fluidisation chamber and to re-circulate it again into the ascending pipeline branch.

Further, DE-A-37 35 825 discloses an apparatus for calcining powder-form material, in which a fluidisation head is provided in the deflection region of an ascending or descending pipeline branch.

A double change in direction is also known from practice, in which the ascending pipeline branch discharges from above via a 180° elbow into a separator funnel. From this funnel, the dispersion is guided upwards via a second 180° elbow, which merges into the descending pipeline branch. A part of the relatively coarse solids particles is separated out downwards in the funnel and re-circulated to the ascending pipeline branch. This double change in direction does produce a very good degree of mixing, but also causes a relatively great pressure loss.

Finally, DE-A-27 51 876 discloses a calcining stage illustrated very diagrammatically in an apparently angular arrangement of piping. More specific structural details of the diversion zone cannot be derived from this schematic illustration, however.

The invention is therefore based on the problem of optimising an apparatus of the kind mentioned in the introduction in respect of the degree of mixing and pressure loss. That problem is solved in accordance with claim 1 in that the diversion zone is formed by a diversion chamber that has a first section that is widened with respect to the cross-section of the ascending pipeline branch and is bounded upwardly by a deflecting wall oriented substantially transversely to the direction of flow of the material entering the diversion chamber via the ascending pipeline branch, adjoining which first section is at least one second section that runs obliquely downwards and tapers conically to the cross-section of the descending pipeline branch.

In accordance with claim 2, the problem is solved in that the diversion zone is formed by a diversion chamber that has a first section widening conically with respect to the ascending pipeline branch and a second section that is bounded by a deflecting wall oriented substantially transversely to the direction of flow of the material entering the diversion chamber via the ascending pipeline branch, wherein the descending pipeline branch projecting in the manner of an immersion pipe into the diversion chamber is lead obliquely downwards out of the diversion chamber.

Further advantages and constructions of the invention are explained in detail from the description of several exemplary embodiments and from the drawings, in which.

Figure 1:
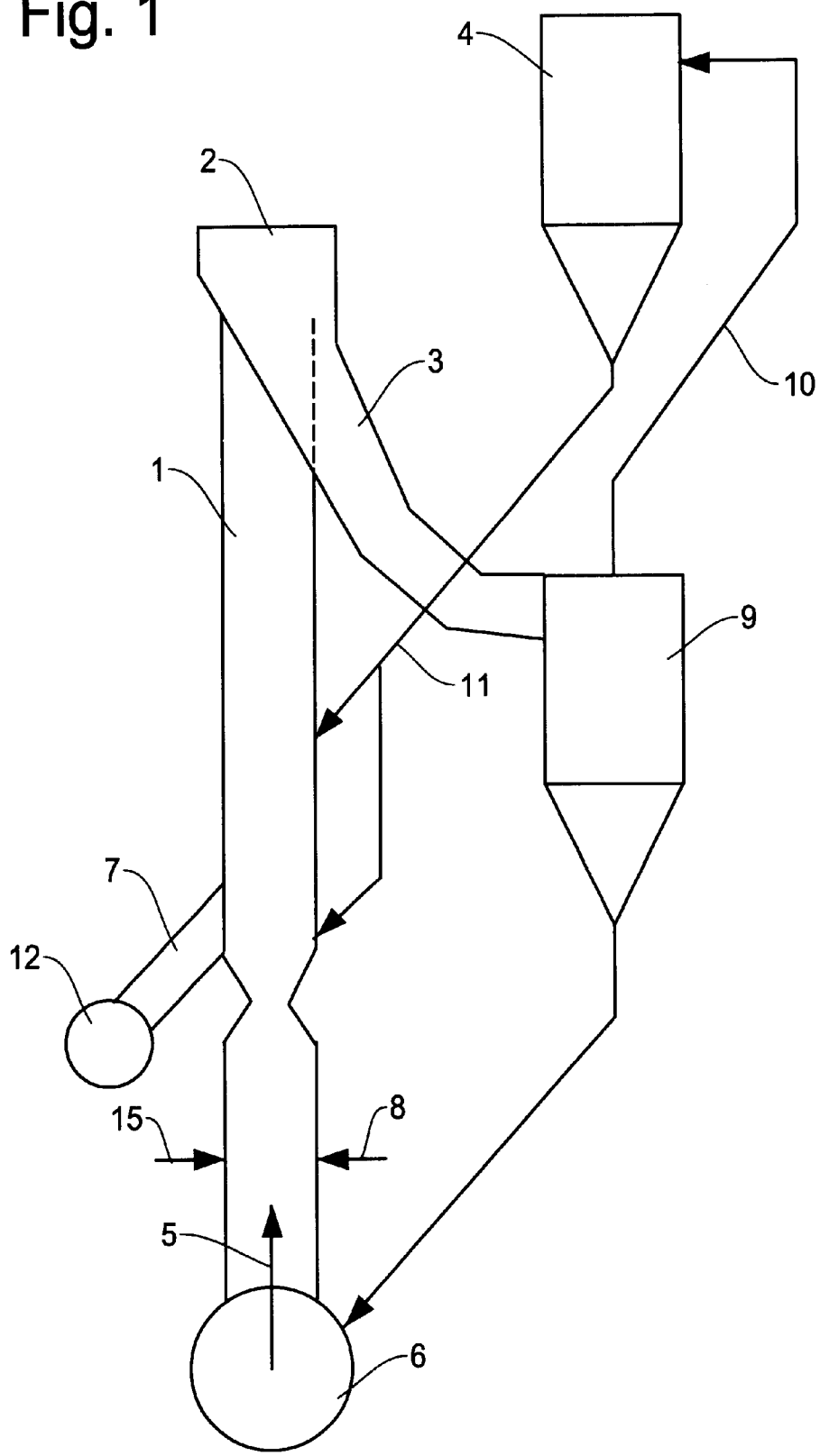
FIG. 1 is a diagrammatic illustration of an apparatus for treating material in accordance with a first exemplary embodiment

The apparatus illustrated in FIG. 1 for treatment of material is in the form of apparatus for calcination of material, especially cement raw material. Essentially, it comprises an ascending pipeline branch 1, a diversion chamber 2 and a descending pipeline branch 3.

The material, for example, cement raw meal, is pre-heated in an upstream pre-heater, of which only a cyclone 4 is shown in FIG. 1, and then fed via a conduit 11 at one or more points into the ascending pipeline branch 1.

Firstly, a flow of exhaust gas 5 from a sintering stage, especially a kiln 6, and, for example, tertiary air 7 coming from a cooler 12, are introduced into the ascending pipeline branch 1. Furthermore, in the region of the ascending pipeline branch 1 there are provided one or more fuel admission points 8. In addition, one or more raw meal admission points 15 can be arrange in the region of the ascending pipeline branch 1.

From the ascending pipeline branch 1, the material is introduced in the form of a gas-raw meal-fuel dispersion via the diversion chamber 2 and the descending pipeline branch 3 into a cyclone 9 for the purpose of separating the calcined raw meal from the flow of gas. The flow of gas enters the preheater via the conduit 10 and the calcined material enters the kiln 6 via the conduit 13.

With reference to FIGS. 2 to 8, some variants of the diversion chamber 2 according to the first exemplary embodiment illustrated in FIG. 1 are explained in detail hereinafter:

In all the variants, the diversion chamber 2 has a deflecting wall 2a that is oriented substantially transversely to the direction of flow of the material entering the diversion chamber 2 via the ascending pipeline branch 1.

The diversion chamber 2 advantageously comprises a first section 2b that is widened compared with the cross-section of the ascending pipeline branch and adjoining the first section a second section 2c tapering conically to the cross-section of the descending pipeline branch 3. The second section 2c is oriented obliquely downwards in the embodiment illustrated.

Figure 2:
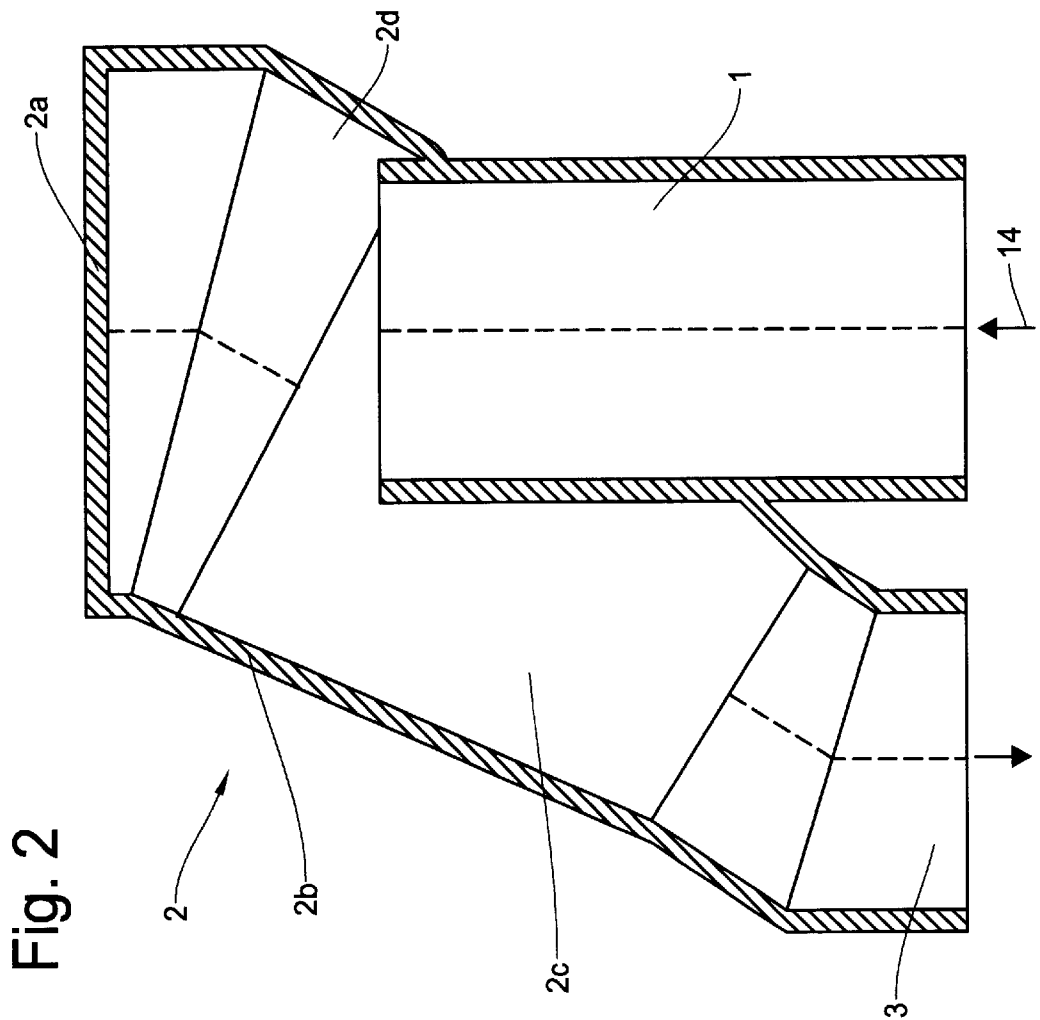
FIGS. 2 to 8 are cut-away views in the region of the diversion chamber according to several variants of the first exemplary embodiment.

In the variant illustrated in FIG. 2, the ascending pipeline branch 1 discharges in the form of an immersion pipe into the diversion chamber 2, the ascending pipeline branch 1 extending spaced from a lateral limitation 2d of the first section 2b, that is, centrally, into the diversion chamber. The cross-section of the ascending pipeline branch is normally circular. The cross-section may alternatively, however, be angular, especially four-cornered.

The gas-raw meal-fuel dispersion entering the diversion chamber 2 is diverted through at least 135° without separation of particles and discharged over the entire circumference of the diversion chamber into the descending pipeline branch 3. By impacting against the deflecting wall 2a in the first section 2b, the dispersion is intimately mixed and fluidised.

Figure 3:
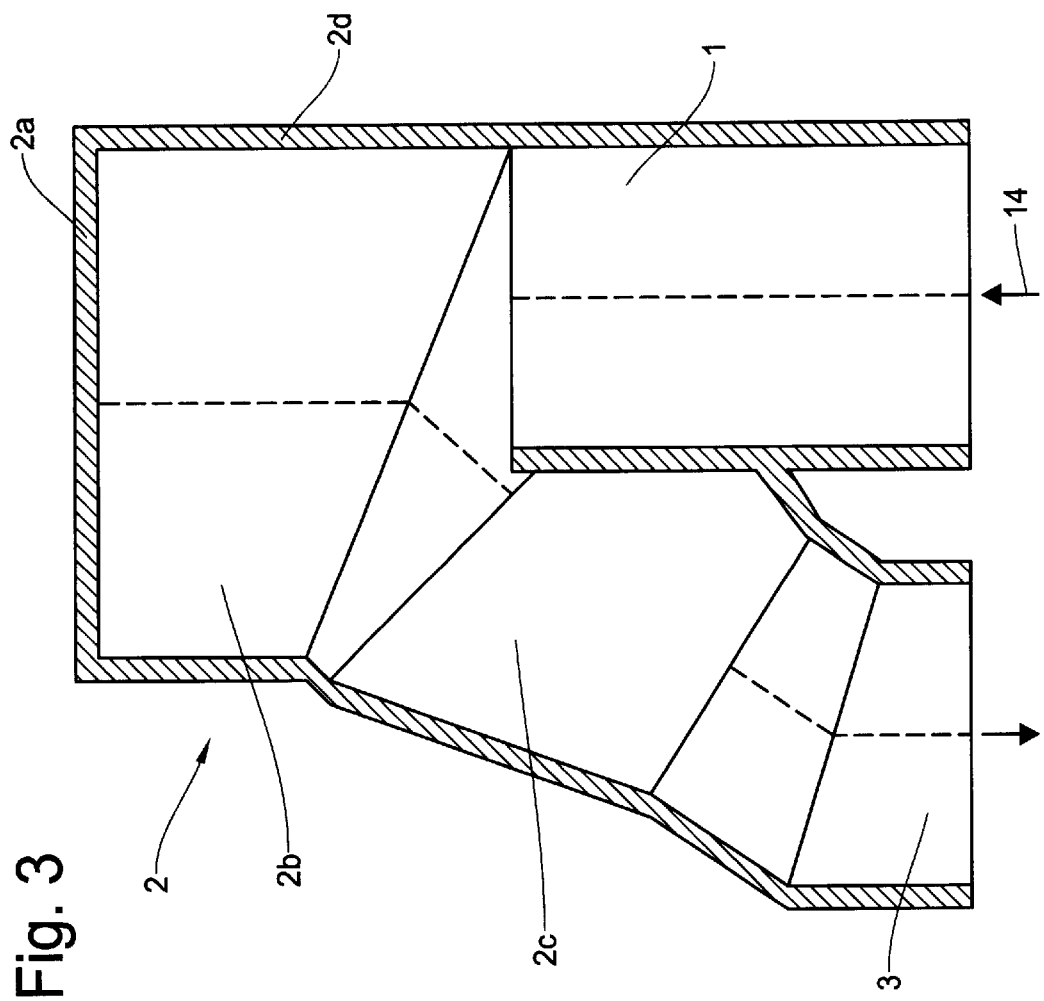

The second variant in accordance with FIG. 3 is distinguished in particular by the ascending pipeline branch 1 projecting into the diversion chamber 2. This ascending pipeline branch is again in the form of an immersion pipe, but arranged eccentrically with respect to the diversion chamber 2. In this embodiment, the immersion pipe immediately adjoins the lateral limitation 2d of the first section 2b of the diversion chamber 2. In addition, the conically tapering second section 2c of the diversion chamber 2 is oriented substantially more steeply downwards compared with the second section of the embodiment according to FIG. 2.

Figure 4:
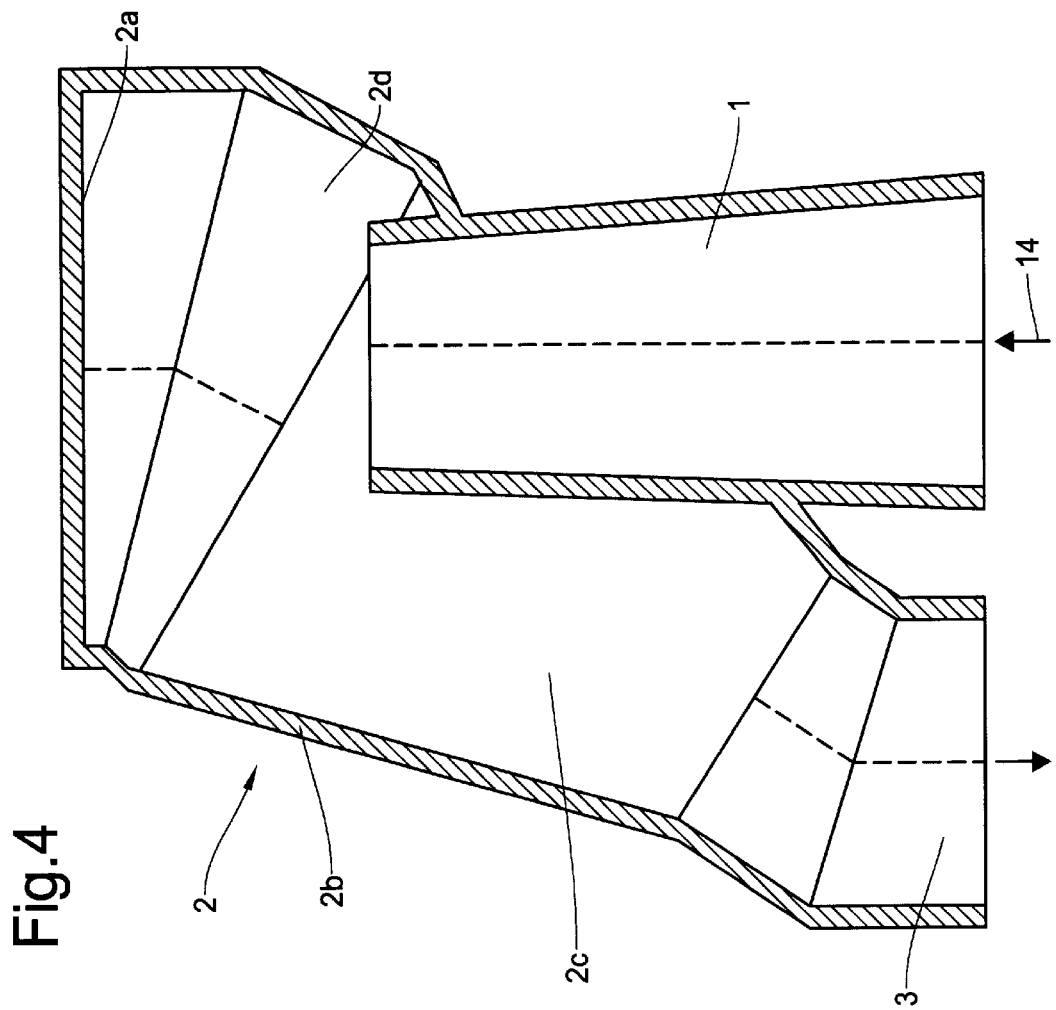

In the variant according to FIG. 4, the ascending pipeline branch 1 in the form of an immersion pipe is conically tapered in the region of the diversion chamber. In this way, it is possible to achieve a higher entry speed of the gas-solid-fuel dispersion into the diversion chamber 2.

Figure 5:
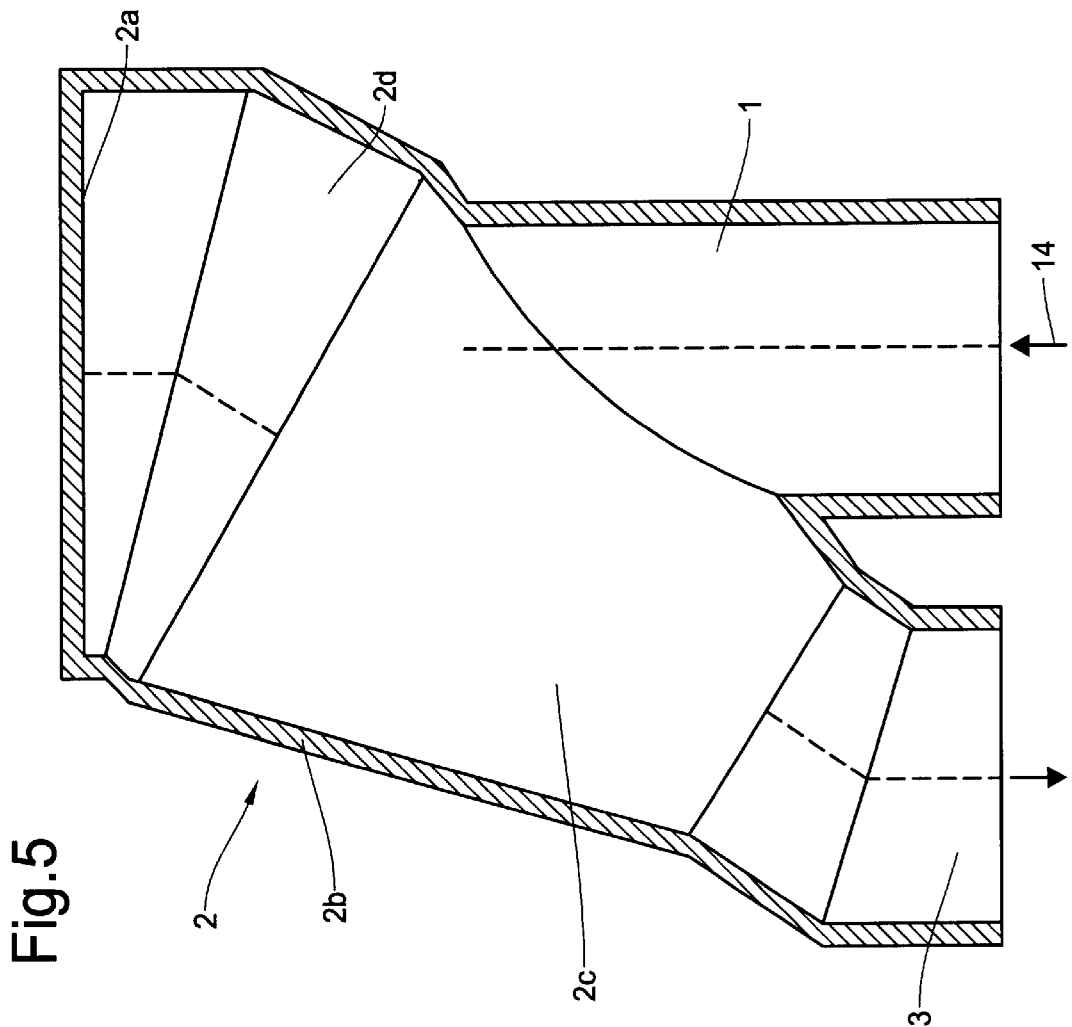

The diversion chamber 2 according to FIG. 5 is identical with the diversion chamber according to FIG. 2, the only difference being that the ascending pipeline branch 1 opening into the diversion chamber in this variant is not in the form of an immersion pipe.

Figure 6:
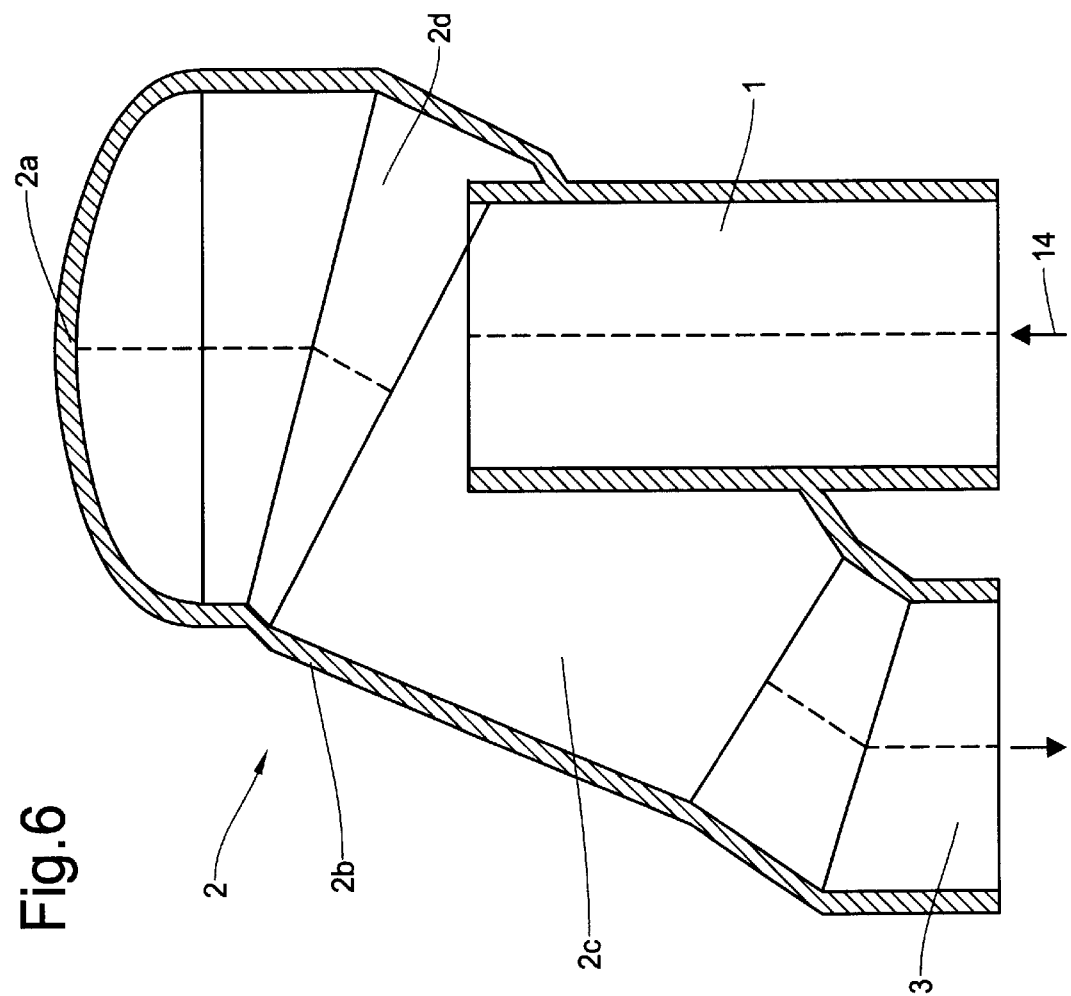

The diversion chamber illustrated in FIG. 6 corresponds to the diversion chamber according to FIG. 2, the only difference being that the deflecting wall 2a is not flat but elliptically curved. But in both cases the deflecting wall extends substantially transversely to the direction of flow 14 of the material entering the diversion chamber 2 via the ascending pipeline branch 1.

Figure 7:
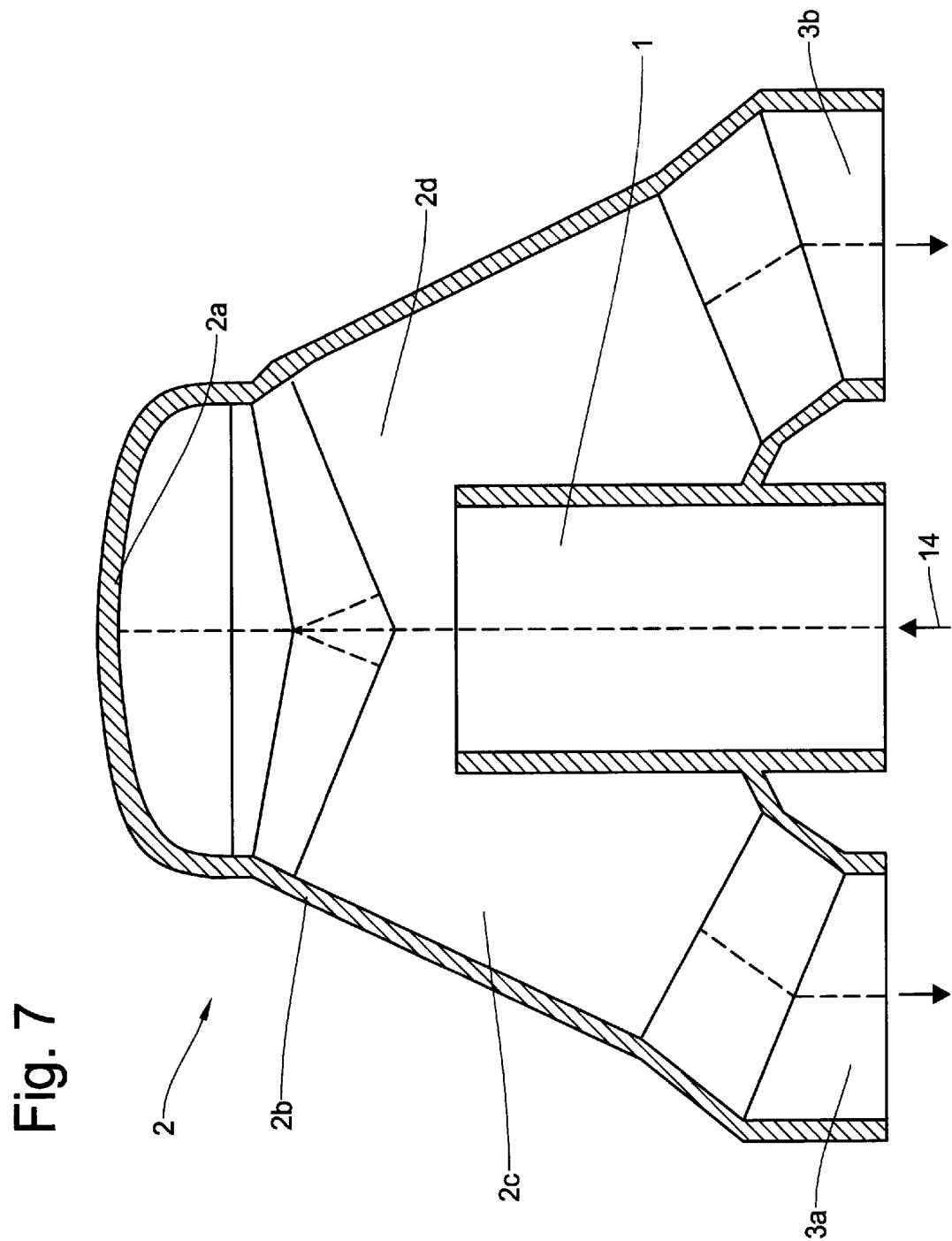
Figure 8:
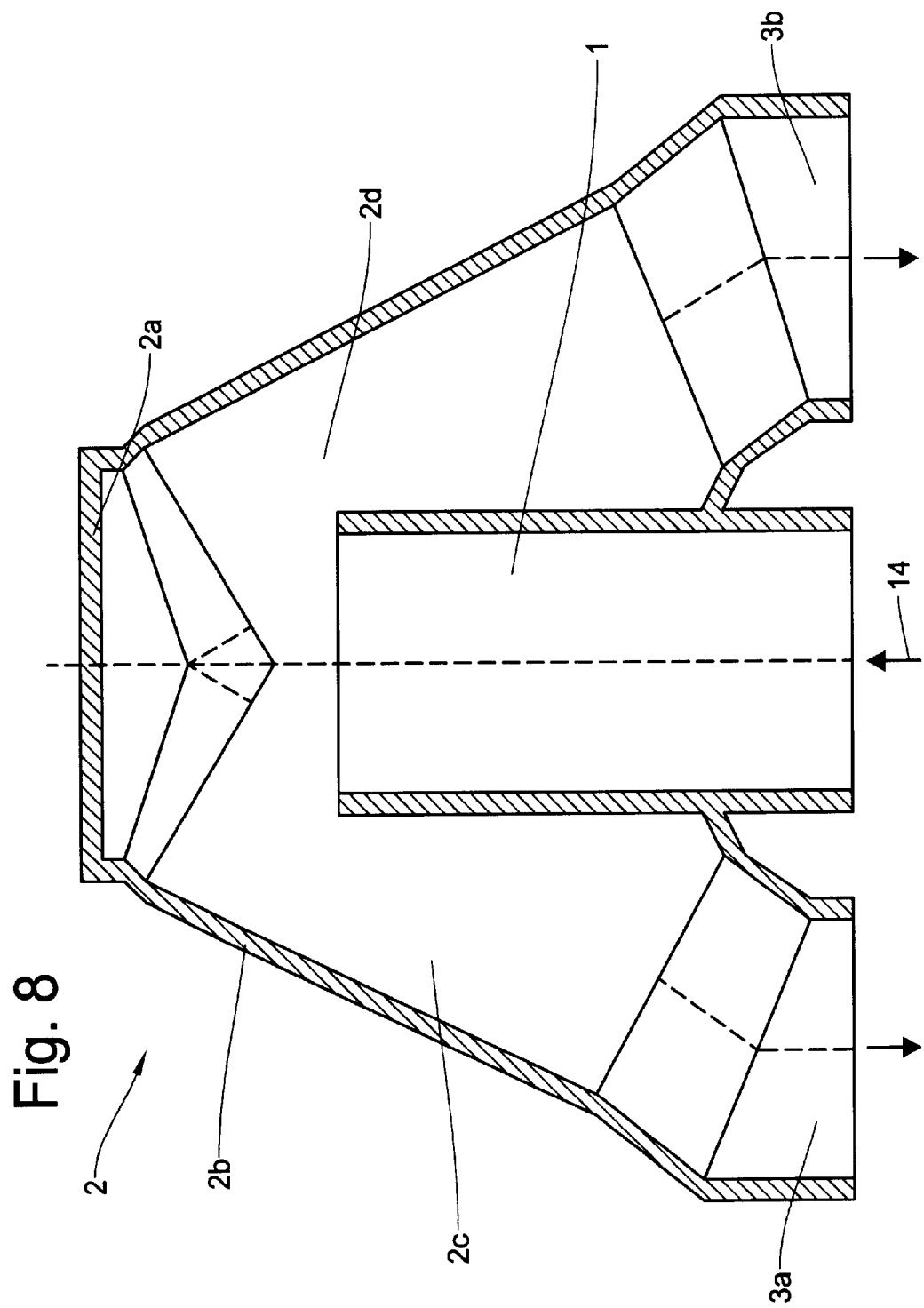

FIGS. 7 and 8 illustrate two further variants, which comprise an ascending pipeline branch, the diversion chamber 2 and two descending pipeline branches 3a, 3b. Such arrangements are especially practical when the gas subsequently flows through two preheating pipe runs arranged parallel to one another.

The deflecting wall 2a is elliptically curved in the variant according to FIG. 7, and flat in the variant according to FIG. 8.

In the construction of the diversion chamber, special care must be taken that there is minimal pressure loss between entry and exit. At the same time, however, it is desired to achieve the greatest possible degree of mixing between the raw meal particles, the fuel particles, the exhaust gas flow and the tertiary air. Good fluidisation and hence good mixing leads to a more complete combustion and hence to a more complete calcination of the raw meal, with the result that ultimately also the CO-emission can be reduced.

In the tests underlying the invention, the pressure loss and the degree of mixing were ascertained for the variants shown in FIGS. 2 to 5 and for the double change of direction already known and described in the introduction to the description. In the investigations, two flows of gas (a main gas flow and a second flow) were used, and the degree of mixing and the pressure loss was determined. The main gas flow contained as gas component pure $N_2$, and the second flow contained as gas component pure $O_2$.

A complete mixing $\epsilon=1$ is obtained when the concentrations of $N_2$ and $O_2$ are equal at any point of a cross-sectional area.

Complete mixing $\epsilon$=mean value $(1-(abs(O_2-O_2mean)/(O_2 max- O_2mean)))$ The deviation from the mean value of the $O_2$ concentration is related to the maximum possible deviation and this magnitude is averaged over the area.

The tests were based on the following starting parameters:

first gas component = 100% $N_2$
v = 18 m/s
T = 1023 K
second gas component = 100% $O_2$
v = 18 m/s
T = 1173 K From this, a value $\epsilon=0.23$ was obtained as mean mixing degree on entry into the diversion chamber.

The results of the investigations were as follows:

| Construction | Pressure loss | Degree of mixing |
| --- | --- | --- |
| Double change in direction as per prior art | 2.1 mbar | 0.932 |
| Variant as per FIG. 2 | 0.98 mbar | 0.86 |
| Variant as per FIG. 3 | 0.51 mbar | 0.78 |
| Variant as per FIG. 4 | 1.75 mbar | 0.927 |
| Variant as per FIG. 5 | 0.74 mbar | 0.805 |

From the above test results it can be inferred that the construction variants according to FIGS. 2 to 5 result in a markedly lower pressure loss than the double direction change according to the prior art. The embodiment according to FIG. 4 in particular additionally exhibits very good mixing properties.

The preferred variant depends substantially on requirements. For example, a relatively low pressure loss leads to a corresponding saving of energy, whilst a good degree of mixing contributes in particular to a reduction in pollutants.

Compared with the double change of direction, the above-described variants of the diversion chamber are distinguished by smaller dimensions and a smaller space requirement and finally also by a more simple construction. The obliquely downwardly directed second section 2b of the diversion chamber discharges the raw meal downwards, thus reducing the risk of caking.

Figure 9:
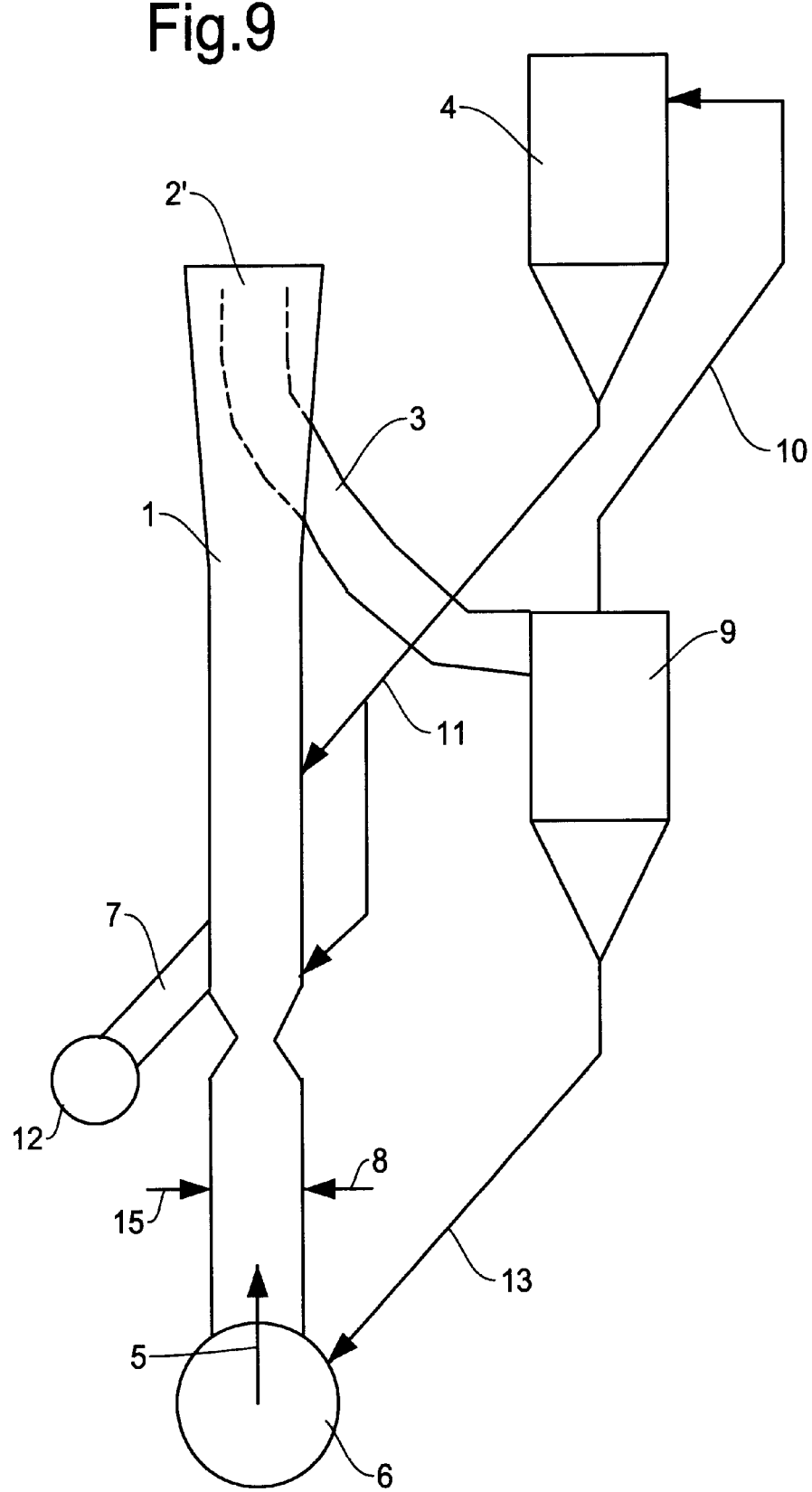
FIG. 9 is a diagrammatic illustration of an apparatus for treating material in accordance with a second exemplary embodiment.

FIG. 9 is a diagrammatic illustration of an apparatus for treating material, especially for calcining of cement raw material in accordance with a second embodiment. It differs from the apparatus according to FIG. 1 only in the construction of the diversion chamber 2'.

The diversion chambers 2' of the variants according to FIGS. 10 to 15 comprise a first section 2'b widening conically compared with the ascending pipeline branch and a second section 2'c having the defecting wall 2'a. The descending pipeline branch 3 in these embodiments is preferably in the form of an immersion pipe. In these variants too, the deflecting wall 2'a extends substantially transversely to the direction of flow 14 of the material entering the diversion chamber 2' via the ascending pipeline branch 1.

The widening first section 2'b is also advantageously oriented vertically upwards. The descending pipeline branch 3 projecting in the manner of an immersion pipe into the diversion chamber 2' is led obliquely downwards out of the diversion chamber 2'.

Figure 10:
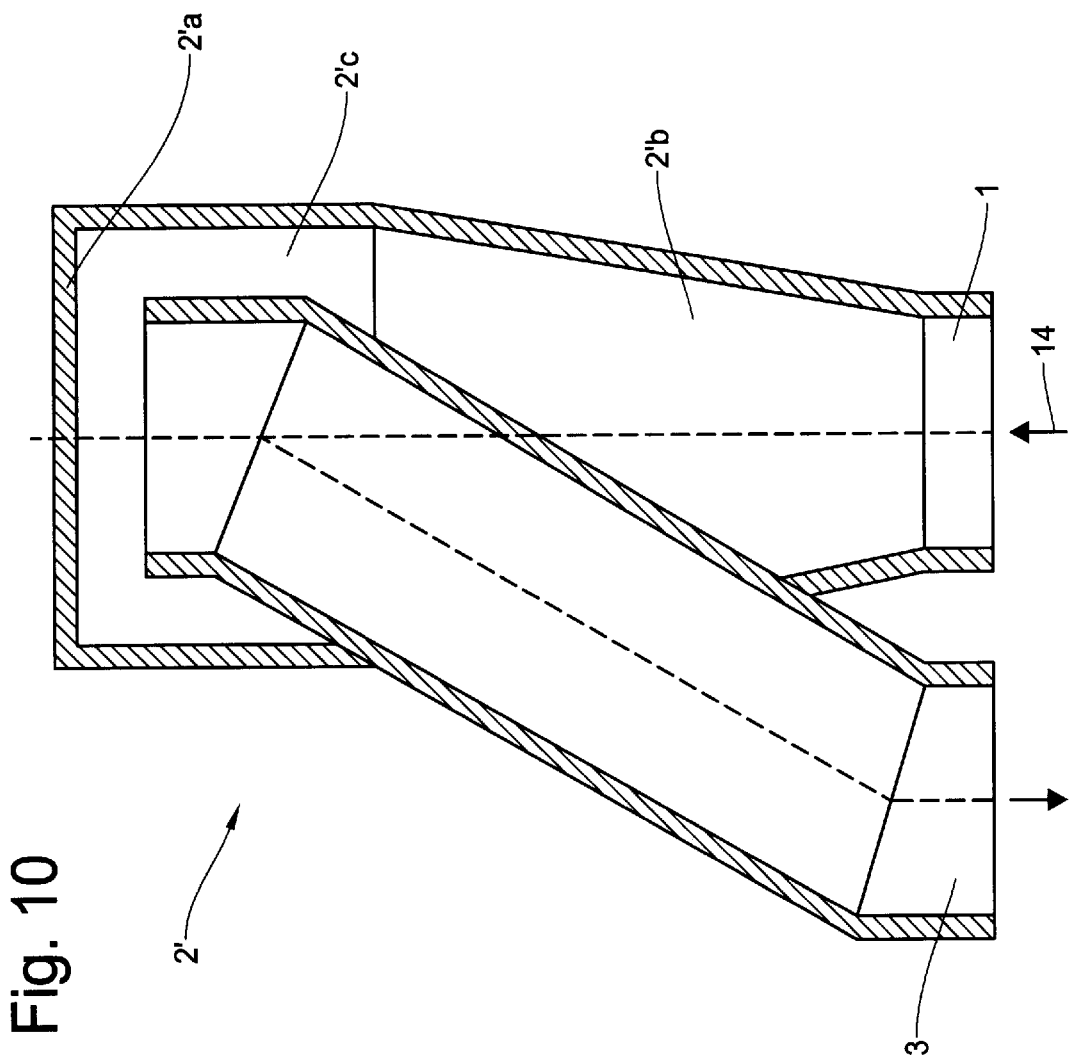
FIGS. 10 to 15 are cut-away views in the region of the diversion chamber according to several variants of the first second embodiment.
Figure 11:
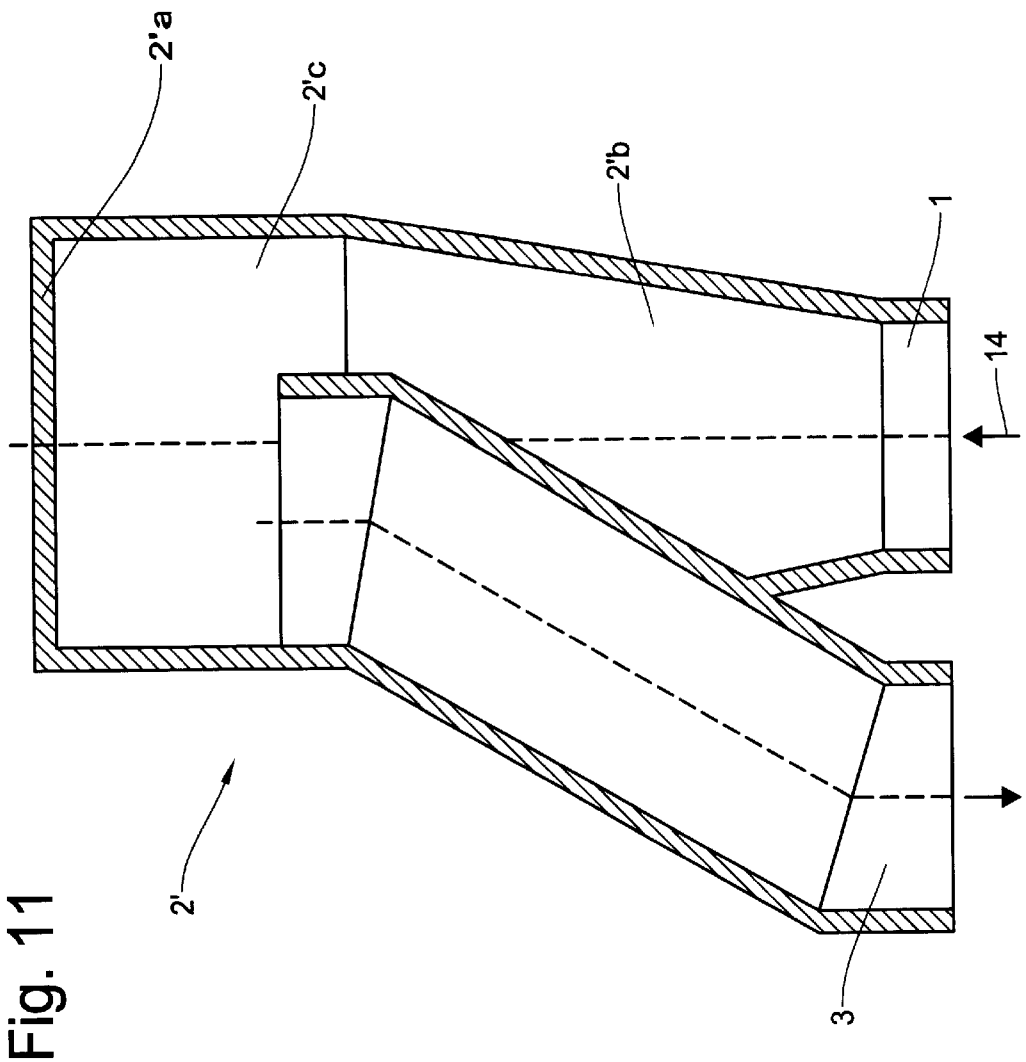

In the variant according to FIG. 10, the descending pipeline branch 3 projects approximately centrally into the second section 2'c of the diversion chamber 2'. In comparison, the descending pipeline branch 3 in the variant shown in FIG. 11 projects eccentrically into the second section 2c the diversion chamber 2'.

Figure 12:
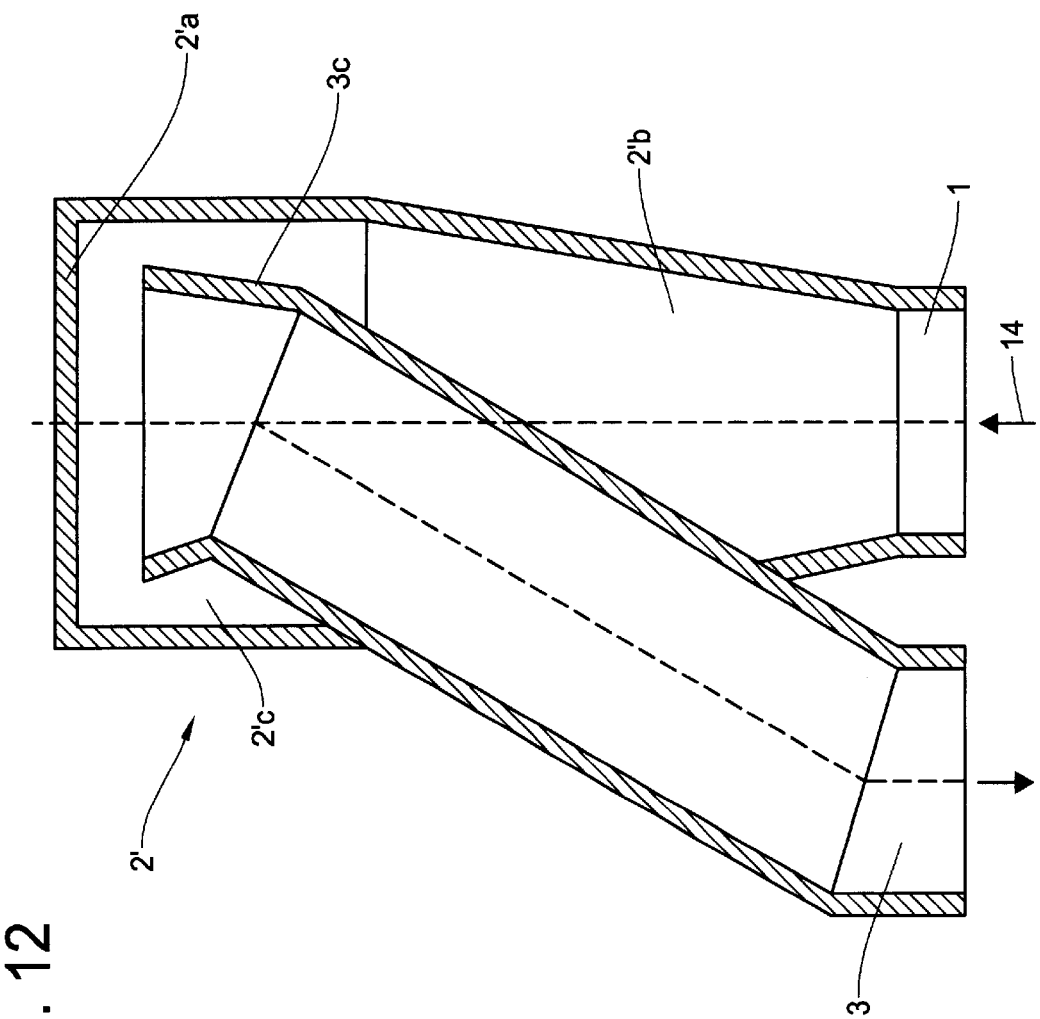
Figure 13:
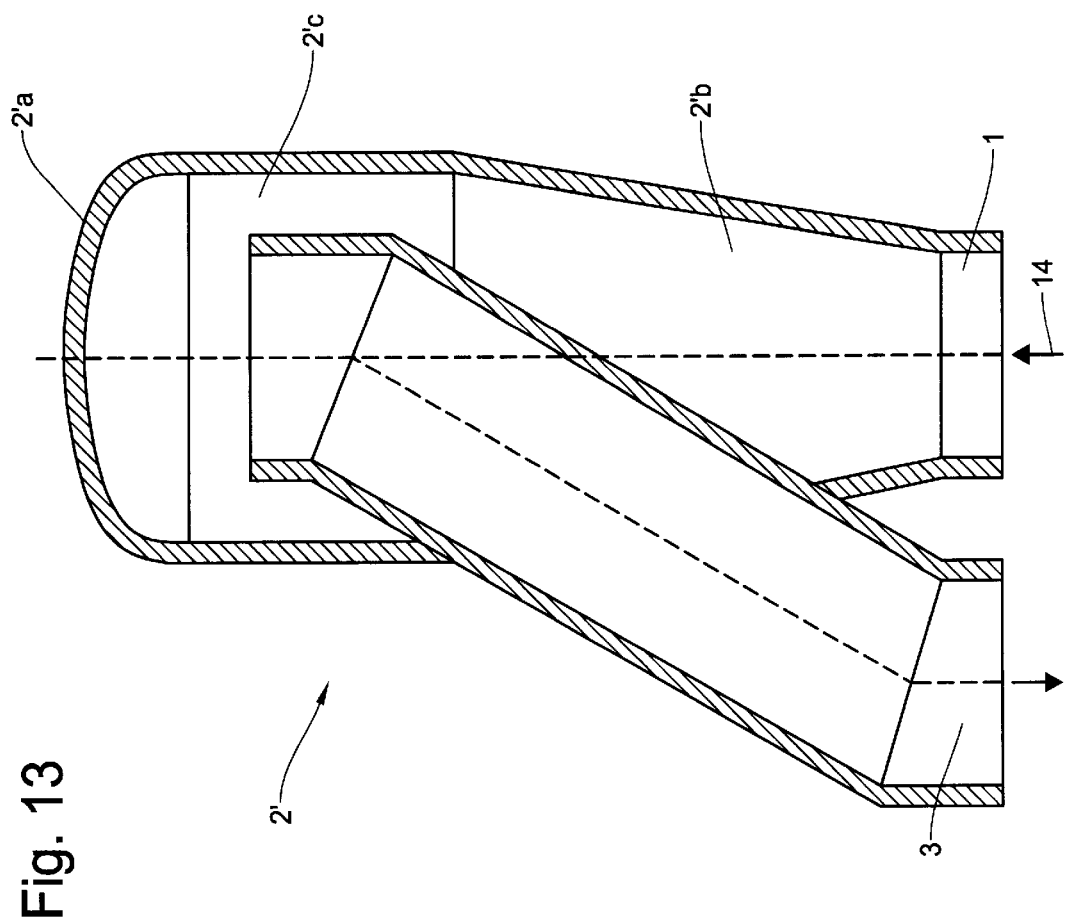
Figure 14:
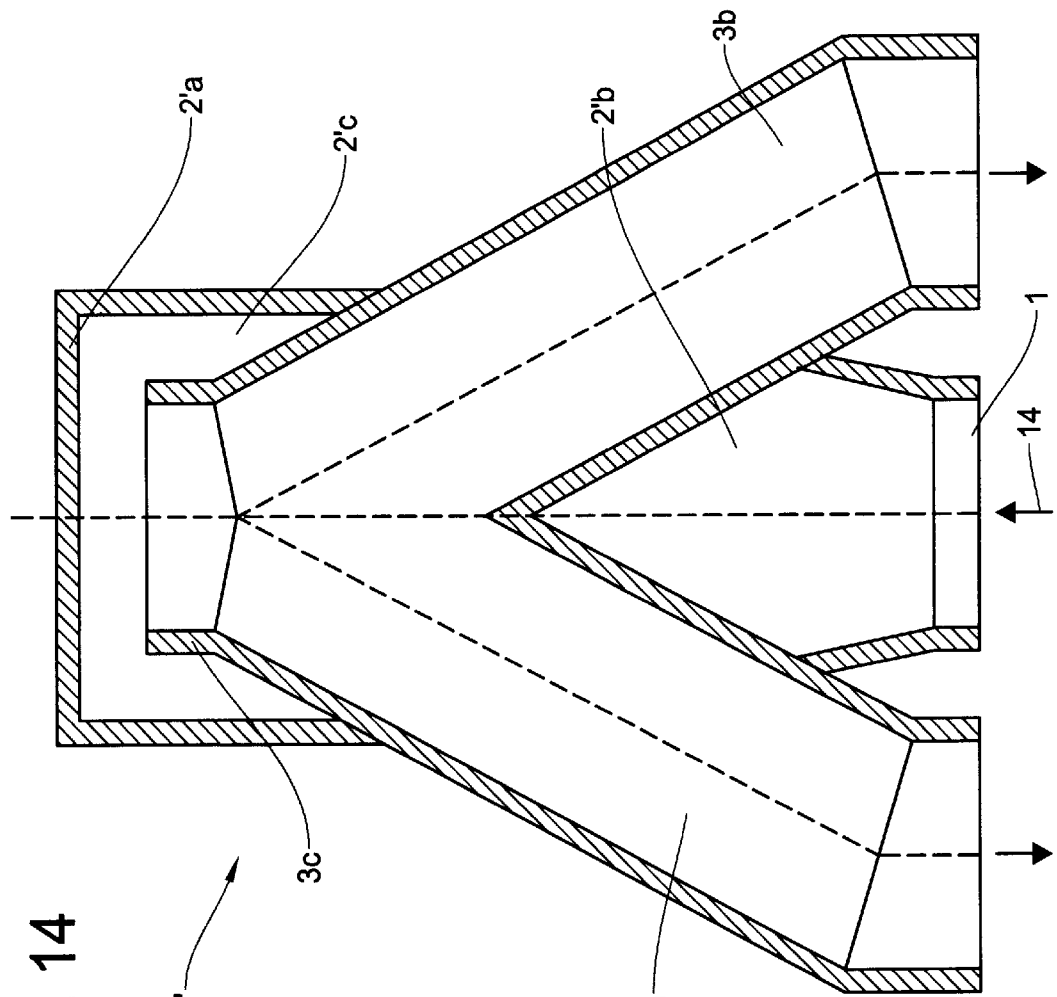

FIG. 12 shows a conically widened opening region 3c of the descending pipeline branch 3, to ensure a more reliable discharge of the dispersion from the diversion chamber 2' and to achieve a higher entry speed of the gas-solids dispersion into the diversion chamber 2'. The diversion chamber shown in FIG. 13 corresponds substantially to the diversion chamber shown in FIG. 10, the only difference being that the deflecting wall 2'a is elliptically curved in this embodiment.

Figure 15:
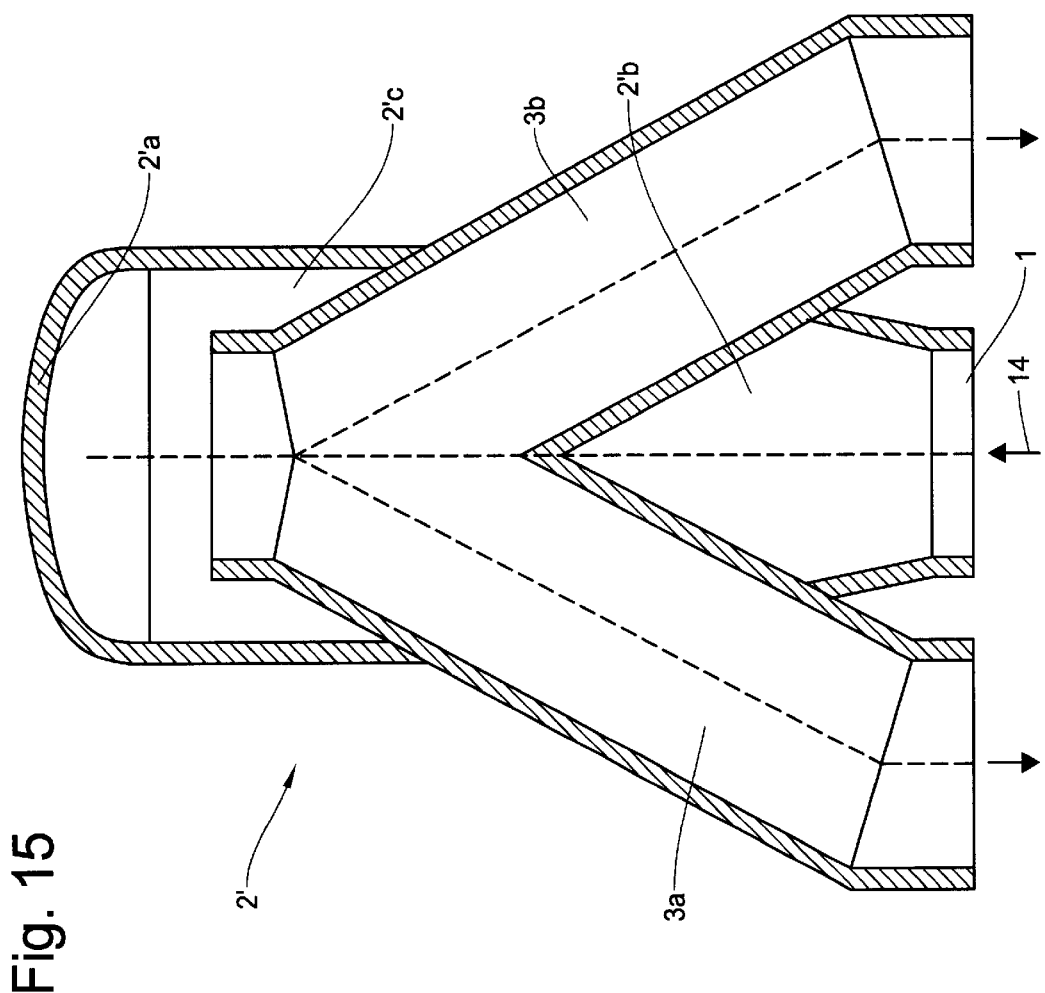

The construction variants shown in FIGS. 14 and 15 again have two descending pipeline branches 3a, 3b, which converge inside the diversion chamber 2' and share a common opening region 3c. The variant according to FIG. 14 exhibits a flat deflecting wall 2'a, whilst an elliptically curved deflecting wall 2'a is shown in FIG. 15.

Figure 16:
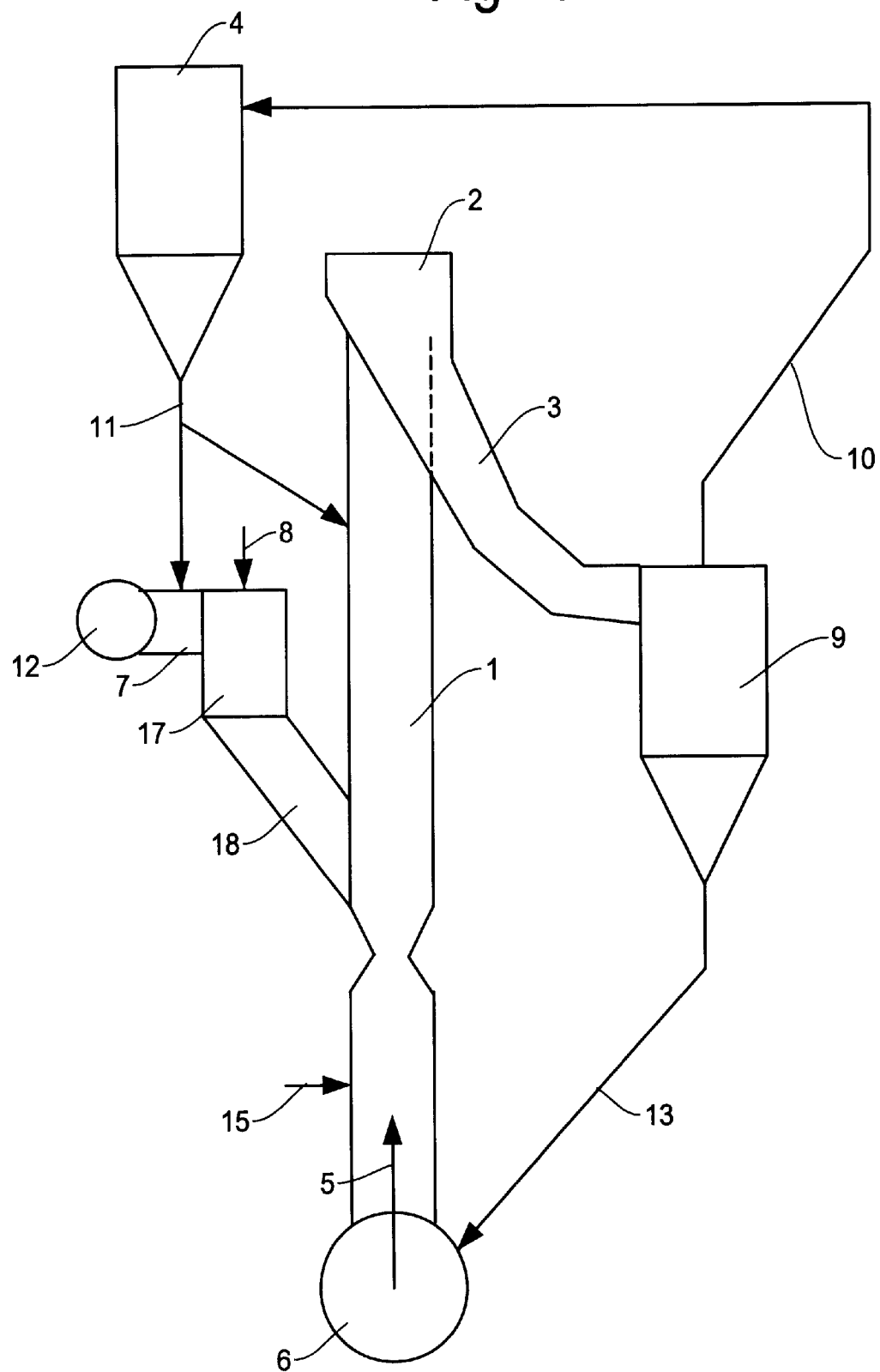
FIG. 16 is a diagrammatic view of an apparatus for the treatment of material in accordance with a third exemplary embodiment.

FIG. 16 shows the layout of a system (similar to FIG. 1) having an additional combustion chamber 17 for pre-calcination of the pre-heated raw material.

The combustion chamber 17 is equipped with one or more fuel admission points 8 and is connected to the cooler 12 via a tertiary air conduit 7.

Part of the raw meal pre-heated in the pre-heater and separated in the cyclone 4 passes into the tertiary air conduit 7 leading to the combustion chamber 17, and part of it passes into the ascending pipeline branch 1 of the calcining stage. The material already substantially calcined in the combustion chamber 17 enters via a conduit 18 into the ascending pipeline branch 1. A further raw meal supply point 15 is provided in the lower region of the ascending pipeline branch 1.

For the rest the construction and function of the system correspond to the embodiment according to FIG. 1.

In all embodiments and variants, all the material entering via the ascending pipeline branch 1 is discharged via the one or both descending pipeline branches. No intermediate separation of a partial flow of material takes place.

The invention is not restricted, however, to the construction variants described. For example, in particular the position of the immersion pipe and its form and length can be modified.

What is claimed is:

1. Apparatus for the heat treatment of meal-form raw material, which is pre-heated in a pre-heating stage, calcined in a calcining stage, undergoes final roasting in a combustion stage and is cooled in a cooling stage, wherein the calcining stage contains a pipeline through which the exhaust gases of the combustion stage flow having an ascending branch, at least one descending branch and a diversion zone arranged therebetween, characterised in that the diversion zone is formed by a diversion chamber (2) that comprises a first section (2b) that is widened compared with the cross-section of the ascending pipeline branch (1) and is bounded upwardly by a deflecting wall (2a) oriented substantially transversely to the direction of flow of the material entering the diversion chamber (2) via the ascending pipeline branch (1), adjoining which first section is at least one second section (2c) that runs obliquely downwards and tapers conically to the cross-section of the descending pipeline branch (3, or 3a, 3b).

2. Apparatus for the heat treatment of meal-form raw material, which is pre-heated in a pre-heating stage, calcined in a calcining stage, undergoes final roasting in a combustion stage and is cooled in a cooling stage, wherein the calcining stage contains a pipeline through which the exhaust gases of the combustion stage flow having an ascending branch, at least one descending branch and a diversion zone arranged therebetween, characterised in that the diversion zone is formed by a diversion chamber (2') that comprises a first section (2'b), which is widened compared with the ascending pipeline branch (1), and a second section (2'c), which is bounded by a defecting wall (2'a) oriented substantially transversely to the direction of flow of the material entering the diversion chamber (2') via the ascending pipeline branch (1), wherein the descending pipeline branch (3, or 3a, 3b) projecting in the manner of an immersion pipe into the diversion chamber (2') is lead obliquely downwards out of the diversion chamber.

3. Apparatus according to claim 1 or 2, characterised in that one of the two pipeline branches (1, 3, 3a, 3b) projects as immersion pipe into the diversion chamber (2, 2').

4. Apparatus according to claim 1 or 2, characterised in that the defecting wall (2a, 2'a) is of flat construction.

5. Apparatus according to claim 1 or 2, characterised in that the deflecting wall is of curved construction.

6. Apparatus according to claim 1, characterised in that the ascending pipeline branch (1) opens out centrally into the first section (2b) of the diversion chamber (2).

7. Apparatus according to claim 1, characterised in that the ascending pipeline branch (1) opens out eccentrically into the first section (2b) of the diversion chamber (2).

8. Apparatus according to claim 1, characterised in that the ascending pipeline branch (1) is conically tapered in the region of the diversion chamber (2).

9. Apparatus according to claim 2, characterised in that the descending pipeline branch (3) projects centrally into the second section (2'c) of the diversion chamber (2).

10. Apparatus according to claim 2, characterised in that the descending pipeline branch projects eccentrically into the second section (2'b) of the diversion chamber.

11. Apparatus according to claim 2, characterised in that the conically widening first section is oriented vertically upwards.

12. Apparatus according to claim 1 or 2, characterised in that two descending pipeline branches (3a, 3b; 3'a, 3'b) are provided and the diversion chamber (2, 2') is constructed such that all material entering via the ascending pipeline branch (1) is discharged via the two descending pipeline branches.

* * * * *